INVENTOR.
S. M. MARTIN
BY A. C. Schwarz, Jr.
ATTORNEY

INVENTOR.
S. M. MARTIN
BY A. C. Schwarz, Jr.
ATTORNEY

INVENTOR.
S. M. MARTIN
BY A. C. Schwarz, Jr.
ATTORNEY

INVENTOR.
S. M. MARTIN
BY A. C. Schwarz, Jr.
ATTORNEY

Sept. 4, 1962 S. M. MARTIN 3,052,010

APPARATUS FOR DISTRIBUTING A STRAND INTO A ROTATABLE OPEN-TOPPED RECEIVER

Filed June 11, 1958 5 Sheets-Sheet 5

INVENTOR.
S. M. MARTIN
BY A. C. Schwarz, Jr.
ATTORNEY

United States Patent Office 3,052,010

Patented Sept. 4, 1962

3,052,010

APPARATUS FOR DISTRIBUTING A STRAND INTO A ROTATABLE OPEN-TOPPED RECEIVER

Samuel M. Martin, Lutherville, Md., assignor to Western Electric Company, Incorporated, New York, N.Y., a corporation of New York Filed June 11, 1958, Ser. No. 741,324
21 Claims. (Cl. 28—21)

The present invention relates to apparatus for distributing a strand into a rotatable open-topped receiver, and particularly to apparatus for distributing a flexible strand in the form of loops in a rotatable take-up barrel.

In the manufacture of various types of conductors for the communications industry, it is usually necessary to perform a succession of manufacturing operations involving running lengths of strand material of one type or another. Between most of the several manufacturing operations, a relatively long length of the strand produced in one operation is taken up, for example, by winding the strand on a take-up reel or by distributing the strand loosely into a take-up receiver, such as a barrel. The take-up member, such as the reel or barrel, is then transported to another location and the strand is withdrawn therefrom as feed or supply to a subsequent strand-working operation.

In many applications, the strand is of a flexible or elastic nature, an example of which is a highly flexible and elastic type of insulated conductor known as tinsel conductor. Tinsel conductors are used, for example, as the individual conducting units within telephone cords, especially in the spring cord of a modern telephone handset. The tinsel conductor may include a central conducting unit consisting of four ribbons of copper foil wrapped spirally around a textile or fiber thread, such as cotton or nylon, thus forming a highly flexible conducting core. A cotton or nylon sheath is then applied, as by knitting, about the conducting core and, finally, the sheathed core is insulated with an elastic plastic material, such as polyvinyl chloride, which may be extruded about the sheathed core to form the final, insulated tinsel conductor.

It is hereby proposed to take up strand material, particularly flexible strands, such as the tinsel conductors just described, in the form of loosely packed loops in a rotating take-up barrel. Preferably, the barrel has a relatively large volume so as to hold a long length of the strand emerging from one operation for ultimate conveyance to a subsequent strand-working operation, where the strand accumulated in the barrel may be withdrawn. This form of barrel take-up is simpler and more convenient to use than a conventional take-up reel, and is to be used in most cases where a flexible strand is involved.

Reel take-ups generally require a relatively high speed, variable-speed, closely controlled drive for the reel; a synchronized, traversing distributor for the strand; carefully controlled and expensive change-over equipment if a high-speed strand is to be shifted from a full reel to an empty reel "on the fly"; and considerable tension in the length of the strand extending between a main drive capstan and the reel, which tension might damage or break certain highly flexible strands, such as the tinsel conductor described above.

The barrel take-up herein proposed obviates or simplifies most of the problems just mentioned and results in an economical and easy-to-operate take-up system. The barrel is designed to rotate at a relatively slow speed compared to that of the strand or that which would be required for a take-up reel, thus enabling convenient take-up of strands having speeds of at least the order of 1500–3000 feet per minute. Further, the barrel rotates at either a constant speed throughout or, preferably, at either of a small number, such as two, constant speeds. In contrast with this, the peripheral speed of the winding surface of a take-up reel must be substantially equal to the wire speed and the rotational speed must be slowed throughout the take-up operation as the winding surface of the reel builds up with the strand.

Also, the barrel take-up described herein requires no traversing distributor, but only a deflector which may either be stationary or, according to a preferred form of the invention, may move only intermittently between a small number, such as two, fixed positions. In addition, changeover "on the fly" is a relatively simple operation, in the simplest case an empty barrel merely being placed on the barrel-rotating means, displacing a full barrel so that a length of the strand extends between the top of the full barrel and the bottom of the empty barrel. Further, there is substantially no tension in the length of strand extending between the drive capstan and the take-up barrel, which minimizes strand damage and breaks. Additionally, the barrel take-up herein proposed allows the taking up and subsequent paying out of flexible strands moving at very high speeds which could not conveniently be handled with a rotating reel.

It is possible, in certain cases, to take up a strand in a rotating barrel by merely advancing the strand downward in a straight vertical line into the barrel, the strand forming into loops after contacting the surface in the barrel; however, that method has been found to result in nonuniform coverage and distribution patterns in the barrel and to cause tangling and uneven withdrawal during pay out from the barrel, particularly at relatively high strand speeds. Advancement of the strand in a straight line into the barrel is not considered practical with the tinsel conductor described above in cases where the speed of advancement is greater than about 500 feet per minute; whereas, utilizing certain of the deflectors herein proposed to form the advancing strand into a series of loops falling vertically downward at a slow speed into the barrel, strand speeds of at least the order of 3000 feet per minute can be handled easily with relatively uniform distribution in the barrel and substantial freedom from tangling during pay out from the barrel.

An object, therefore, of the invention is to provide apparatus for distributing a strand into a rotatable open-topped receiver.

Another object of the invention is to provide apparatus for distributing a flexible strand in the form of loops in a rotatable take-up barrel.

A more specific object of the invention is to take up a flexible strand advancing at speeds of the order of 2000 feet per minute in uniform bands of loops in a rotating take-up barrel, so that the collected conductor may later be withdrawn evenly from the barrel at the same order of speed without tangling.

An apparatus for distributing a strand into a rotatable open-topped receiver, illustrating certain features of the invention, may include means for rotating the receiver, means for advancing the strand, and a deflector mounted in the path of the advancing strand and designed to preform the advancing strand into a series of loops and to direct the series of preformed loops downwardly so that the loops fall along a substantially vertical line into the rotating receiver.

Means may be provided for moving the deflector transversely with respect to the rotational axis of the receiver to change the line of the distribution of the strand into the receiver. Preferably, means are provided for controlling the operation of the deflector moving means so that the position of the deflector is changed approximately once for each revolution of the receiver. With this arrangement, means are provided, operable upon each change of position of the deflector, for controlling the receiver-rotating means so that the linear speed of the point in the receiver directly below the line of distribution of the strand is substantially the same at each transverse position of the deflector.

According to a first embodiment of the invention, the deflector may comprise a flat plate mounted in the path of the advancing strand and designed to deflect the strand downward in a series of loops falling along a substantially vertical line into a rotating receiver mounted therebelow.

According to a second embodiment of the invention, the deflector may comprise a moving belt mounted in the path of the advancing strand and designed to deflect the strand downward in a series of loops falling along a substantially vertical line into the rotating receiver mounted therebelow.

A third type of deflector may have a spiral shape, designed to receive the advancing strand and direct the strand downward in a series of loops falling along a substantially vertical line into the rotating receiver.

Other objects and advantages of the invention will appear from the following detailed description of specific embodiments thereof, when read in conjunction with the appended drawings, in which.

Figures 1, 3, 4:
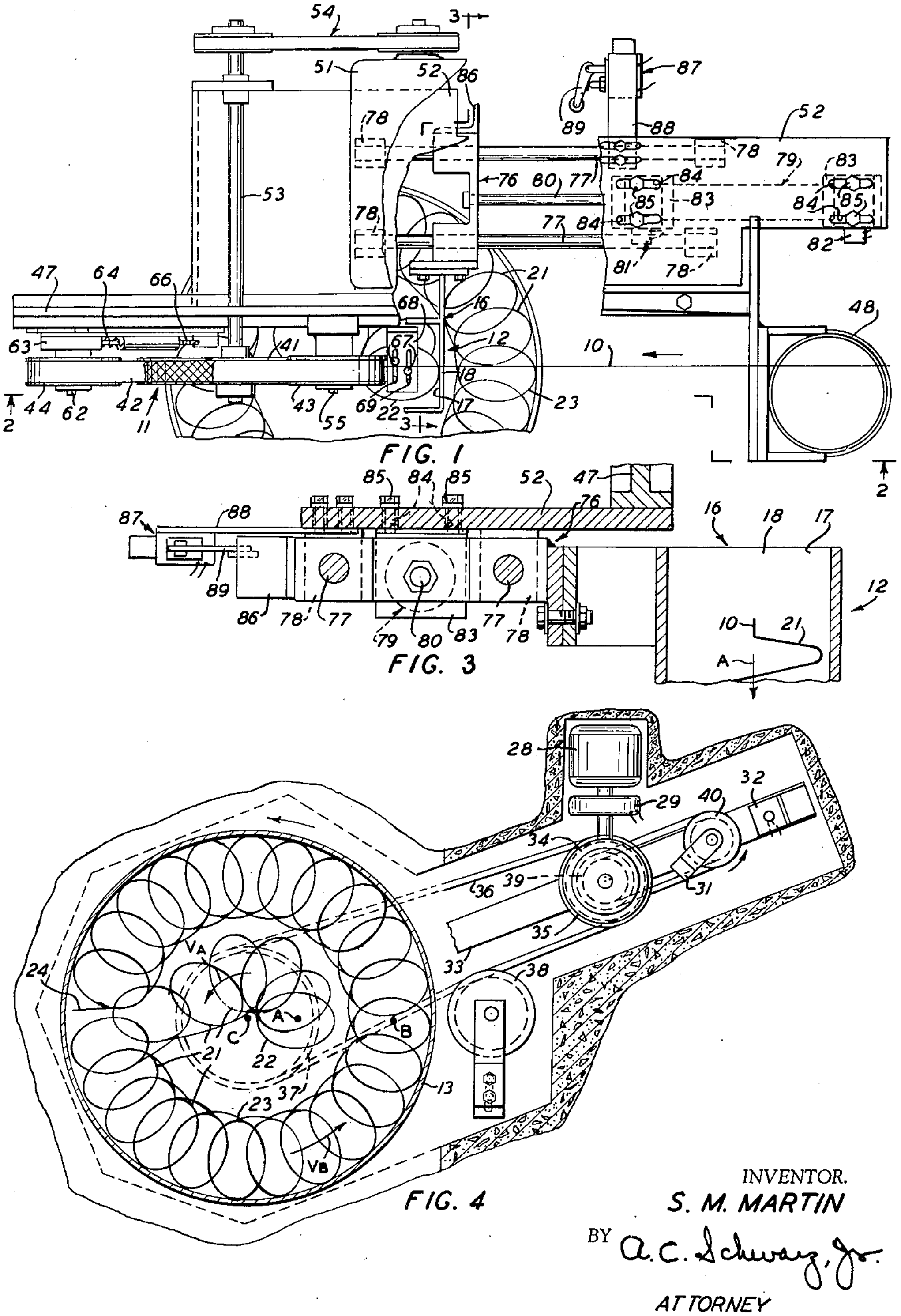
FIG. 1 is a top plan view of an apparatus illustrating a first embodiment of the invention, with portions of supporting structure being broken away to reveal structural details.
FIG. 3 is an enlarged, fragmentary vertical section of a portion of the apparatus illustrated in FIGS. 1 and 2, taken generally along the line 3—3 of FIG. 1 in the direction of the arrows.
FIG. 4 is a horizontal, sectional view, taken generally along the line 4—4 of FIG. 2 and showing the strand partially distributed in a receiver, means for rotating the receiver, and a revolution-responsive control means.
Figure 2:
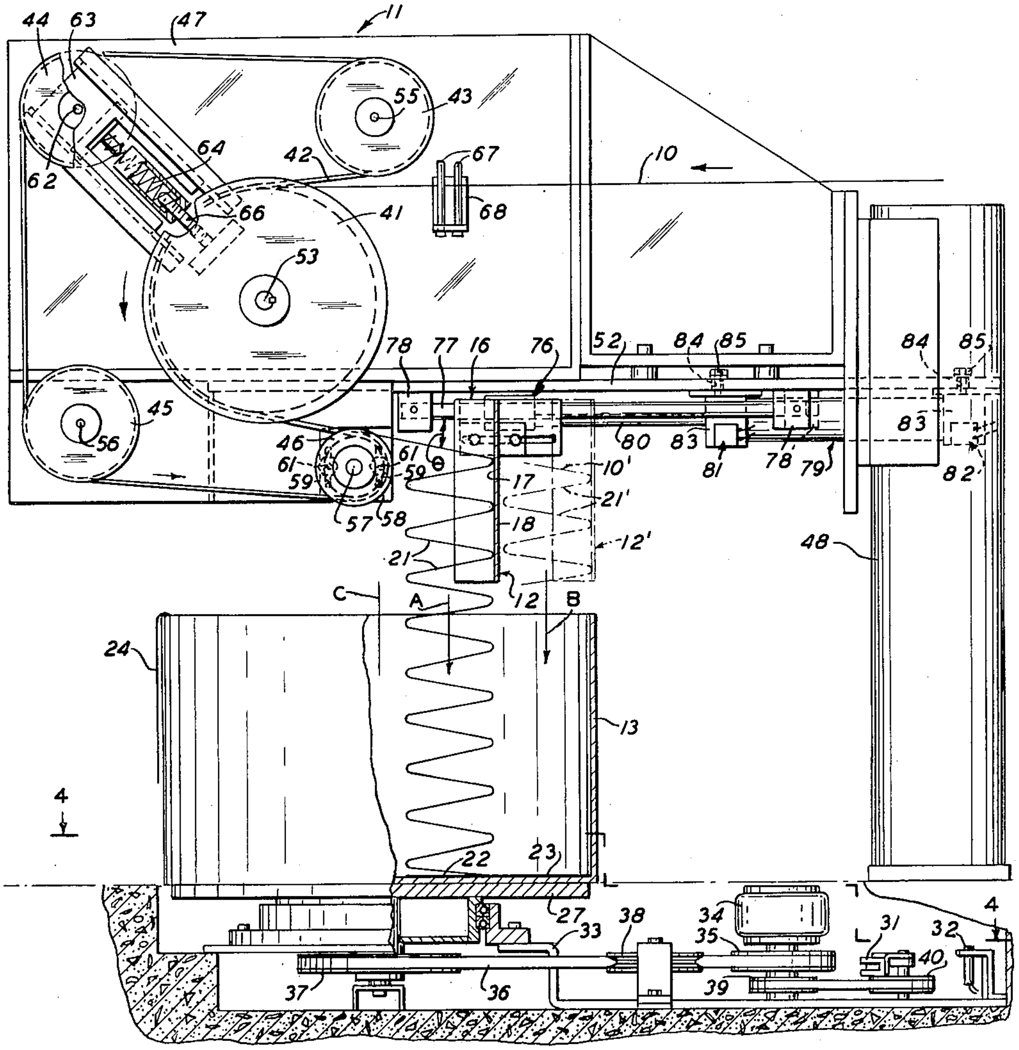
FIG. 2 is a front view, partially in section, of the apparatus illustrated in FIG. 1, taken generally along the line 2—2 of FIG. 1 in the direction of the arrows.

Referring now in detail to the drawings, and in particular to FIGS. 1, 2 and 3, an apparatus is shown for taking up a strand 10. The strand 10 must be of a type which is capable of forming into loops when advanced into engagement with one of the deflectors forming a part of the invention and to be described in detail hereinafter. Preferably, the strand 10 is highly flexible in nature, such as a tinsel conductor for telephone cordage. The strand 10 is supplied continuously from a strand-working apparatus, such as a plastics extruder (not shown but assumed to be off the page to the right of FIGS. 1 and 2).

Means are provided, such as a conventional belt-type capstan, designated generally by the numeral 11, to advance the strand 10 from the strand-working apparatus and direct the strand into engagement with a deflector, designated generically by the numeral 12, which operates to deflect the strand 10 downward in a series of loops falling along a substantially vertical line into a rotating receiver mounted therebelow, such as a take-up barrel 13 illustrated in FIGS. 1, 2 and 4. To minimize friction during take up and subsequent pay out, the strand 10 may be lubricated as it advances to the capstan 11.

The deflector 12 is movable, in a manner to be discussed in detail hereinafter, between an inner position illustrated in solid lines in FIG. 2, wherein the center line of the descending strand loops is indicated by the letter "A," and an outer position depicted in phantom lines in FIG. 2, wherein the deflector is designated by the numeral 12', the strand being deflected thereby is designated by the numeral 10', and the center line of the descending strand loops is indicated by the letter "B." The deflector, generically represented by the numeral 12, may have variant configurations, three particular embodiments of which will be described in detail hereinafter.

*First Embodiment*

According to a first embodiment of the invention, illustrated in FIGS. 1 to 5, inclusive, the deflector 12 may comprise a bracket member, designated generally by the numeral 16. The bracket member 16 is mounted above the barrel 13 so that an inner wall 17 of a flat deflector plate 18, forming a part of the bracket member 16, is disposed in the path of the strand 10 leaving the capstan 11. The bracket member 16 is preferably mounted so that the plate 18 is substantially vertical, but may be canted slightly to facilitate the descension of the strand loops in a substantially vertical line.

The capstan 11 is designed to advance the strand 10 toward the deflector plate 18 at an angle $\theta$ (FIG. 2) below the horizontal. The angle $\theta$ should be in the range of about 10° to 20° and, in the embodiment illustrated, this angle is set equal to about 15°. The capstan 11 should permit adjustment of the angle $\theta$ for various conditions in order to assure vertical descension of the strand loops. The optimum setting for the angle $\theta$ is governed by the type of strand, the speed of advancement thereof, the distance between the capstan 11 and the deflector plate 18, and the inclination, if any, of the deflector plate 18.

The advancing strand 10 impinges against the inner wall 17 of the deflector plate 18 and is thereby formed into a succession of loops 21—21, as illustrated in FIGS. 2 and 3, which descend along the substantially vertical line "A" into the rotating take-up barrel 13 for collection therein as illustrated in FIG. 4. A similar result obtains when the deflector plate 18 occupies its alternative position 12', the strand descending in a similar series of the loops 21—21 along the second, substantially vertical line "B."

The alternative, parallel lines of descension "A" and "B" are so located with respect to the axis of rotation "C" of the barrel 13 that the inner line "A" is located a distance equal to approximately one-quarter of the radius of the barrel 13 from the axis of rotation "C" and the outer line "B" is approximately three-quarters of the radius of the barrel from the axis of rotation "C," as seen in FIGS. 2 and 4.

The barrel 13 is rotated slowly, in a counterclockwise direction as viewed in FIG. 4, so that the descending loops 21—21 are collected therein. Assuming that the deflector plate 18 occupies the inner position, the strand 10 will be collected as the barrel 13 rotates in an inner band 22 of the loops 21—21 occupying a generally circular area having a diameter equal to approximately one-half of the diameter of the barrel 13. This is the distributing position illustrated in FIG. 4, wherein the motion has been arrested at a point where approximately one-half of the inner band 22 has been collected.

When the deflector plate 18 occupies the outer position, so that the strand loops 21—21 descend along the line "B," an outer band 23 of the loops 21—21 is collected in a similar manner. The band 23 occupies an outer, annular area of the bottom of the barrel 13, the width of the annular band 23 being equal to substantially half of the radius of the barrel 13. The adjacent bands 22 and 23 are formed so that they are approximately contiguous, occupying substantially the entire area of the bottom of the barrel 13 without a significant degree of overlapping.

Means are provided, such as an air-cylinder system to be described hereinafter, for indexing the deflector between the inner position 12 and the outer position 12' approximately once for each revolution of the barrel 13. Thus, the strand 10 is distributed in an alternating succession of the bands 22 and 23, each band 22 on top of the last such band and each band 23 on top of the last such band, until the barrel 13 has been filled to a desired depth with the strand 10.

When the barrel 13 has been filled, it may be replaced with an empty barrel and the take-up operation repeated. Change-over may be accomplished simply and easily by merely pushing the full barrel out from under the deflector 12 and inserting an empty barrel thereunder. When this is done, a crossover length of the strand will extend between the top of the full barrel and the bottom of the empty barrel. This crossover length may be severed and then the full barrel is ready for transportation to a subsequent strand-working operation. A portion of the crossover length associated with the barrel 13 is designated in FIGS. 2 and 4 by the numeral 24.

Referring again to FIG. 4, it is preferable to control the rotational speed of the barrel 13 so that the linear speed of the point in the barrel directly below the line of distribution ("A" or "B") of the strand is substantially the same at each transverse position (12 or 12') of the deflector. If $V_B$ (designated by an arrow in FIG. 4) is the linear speed of the point on the bottom of the barrel 13 below the outer line "B" and $V_A$ (also designated by an arrow in FIG. 4) is the linear speed of the point on the bottom of the barrel 13 below the inner line "A," then it is desired to so control the rotational speed of the barrel 13 that $V_A$ equals $V_B$ when the strand is distributed along either one of the lines A or B.

This control is desired in order to assure the distribution of substantially the same amount of the strand 10 per unit circumferential length of both of the bands 22 and 23 so as to provide for even distribution of the strand 10 in the barrel 13. The exact magnitude of this linear speed ($V_A$ equals $V_B$) is not critical since the rotating barrel 13 serves primarily as a collector for the preformed, descending loops 21—21. The magnitude of this linear speed will determine, in combination with the linear speed of the strand, the number of the loops 21—21 collected per unit circumferential length of the bands 22 and 23.

The rotational speed ($W_B$) at the outer position is set equal to $V_B$ divided by the distance between the vertical lines "B" and "C" and the rotational speed ($W_A$) at the inner position is set equal to $V_A$ divided by the distance between the vertical lines "A" and "C." Since, as earlier stated, the distance between "A" and "C" is set at approximately one-quarter of the radius of the barrel 13 and the distance between "B" and "C" is set at approximately three-quarters of the radius of the barrel 13, it will be apparent that the rotational speed when distributing the inner band 22 should be set at substantially three times that when distributing the outer band 23.

The barrel 13 may be rotated by any suitable drive means capable of rotating the barrel 13 alternately at the two predetermined speeds calculated above. A preferred arrangement is illustrated in FIGS. 2 and 4 and includes generally a turntable 27 (FIG. 2) upon which the barrel 13 is placed for rotation therewith, an induction motor 28 (FIG. 4) for driving the turntable 27, and an eddy-current clutch 29, such as an "Adjusto-Spede" clutch manufactured by the Dynamatic Division of the Eaton Mfg. Co., Kenosha, Wisconsin. The eddy-current clutch 29 operates to rotate the turntable 27 at variable speeds depending upon the degree of energization thereof.

The motor 28, through the eddy-current clutch 29, also functions to revolve a magnetic switch actuator 31 in predetermined synchronism with the speed of rotation of the turntable 27 in order to operate a magnetic switch 32 each time the turntable 27 rotates through a predetermined angle. The magnetic switch 32 operates through the control circuit, illustrated in FIG. 5 and to be described in detail hereinafter, to index the deflector between its inner and outer positions 12 and 12' each time the barrel 13 has been rotated through a desired angle.

The turntable 27 is supported for rotation on a recessed platform 33, which is preferably mounted so that the top of the turntable 27 is substantially at floor level in order to facilitate loading and unloading of the barrels. The motor 28 is connected through the eddy-current clutch 29 as an input to a gear box 34, containing suitable speed-reducing gears, and a driving pulley 35 is driven from the output of the gear box 34. A V-belt 36 is passed around the driving pulley 35, a pulley 37 for rotating the turntable 27, and against a belt-tightener pulley 38.

A second pulley 39 is also driven from the gear box 34 and operates through a V-belt to rotate a timing pulley 40, which rotates the switch actuator 31, in predetermined synchronism with the speed of rotation on the turntable 27. The speed of the pulley 40, and thus of the switch actuator 31, is precisely regulated, for example by selecting the size of the pulley 39, in order to insure the desired correlation between the speed of rotation of the barrel 13 with respect to the time of indexing of the deflector 12, as controlled by the switch 32.

The strand-advancing means may be of any suitable type capable of advancing the strand 10 into space at the desired angle $\theta$ toward the deflector 12. Conveniently, a belt-type capstan 11 of conventional type may be employed. Such a capstan includes a positively driven drum 41, a taut belt 42 passing around a portion of the periphery of the drum 41 and also around portions of the periphery of each of four idler sheaves 43, 44, 45 and 46. The strand 10 advances between the belt 42 and the drum 41, being gripped therebetween for advancement as the drum 41 is rotated.

The drum 41 and the idler sheaves 43, 44, 45 and 46 are all mounted for rotation at the front of a supporting frame 47, which in turn is mounted cantilever-fashion on a main support pillar 48. As best seen in FIG. 1, the drum 41 is driven by a motor 51, which is supported on a platform 52 secured in turn to the pillar 48. The motor 51 drives a shaft 53 of the drum 41 through the intermission of a belt-and-pulley transmission, designated generally by the numeral 54.

The capstan 11 may be the means for advancing the strand 10 through the previous operation or, conveniently, the previous operation may be equipped with a separate advancing means so that the capstan 11 merely collects the already-advancing strand at the same rate it is being delivered and advances the same to the deflector 12. In this latter instance, the capstan motor 51 is preferably a torque motor synchronizing the capstan 11 with the previous advancing means.

The idler sheave 43 at the upper-right of FIG. 2 and the idler sheave 45 at the lower-left of the same figure are keyed to stub shafts 55 and 56, respectively, which shafts are mounted at the front of the supporting frame 47 for free rotation about fixed axes.

The idler sheave 46 at the lower-right of FIG. 2 is keyed to a stub shaft 57, which is mounted for rotation in a movable supporting block 58. The supporting block 58 is formed with a pair of vertically extending slots 59—59, designed for receiving a pair of guide bolts 61—61, which extend horizontally from the front of the supporting frame 47. The vertical position of the supporting block 58 may be adjusted, within the limits defined by the length of the slots 59—59, in order to adjust the vertical position of the idler sheave 46 to control the angle θ of advancement of the strand 10 toward the deflector 12. Preferably, the working surface of the drum 41 is lightly knurled, as indicated in FIG. 1, to reduce the contact, so that the strand 10 will leave the drum 41 along a straight line defined by the upper surface of the straight portion of the belt 42 extending between the drum 41 and the discharge sheave 46; thus enabling discharge of the strand 10 at the desired angle θ and precluding any tendency of the strand 10 to ride up with the surface of the drum 41 after the point of tangency between the belt 42 and the drum 41.

The remaining idler sheave 44, at the top-left of FIG. 2, is movably mounted and is spring-biased outward with respect to the drum 41 in order to control the tension in the belt 42. For this purpose, the sheave 44 is keyed to a stub shaft 62, which is mounted for rotation in a movable support 63. The support 63 is mounted for diagonal movement with respect to the supporting frame 47, and a biasing compression spring 64 is mounted between the support 63 and the supporting frame 47 to urge the sheave 44 outwardly and thus provide a desired tension in the belt 42. A set screw 66 is provided to control the position of the lower abutment (FIG. 2) for the spring 64, in order to accommodate variations in the strength of the spring 64.

The advancing strand 10 is fed between a pair of upstanding guide fingers 67—67 as it approaches the capstan 11. The guide fingers 67—67 are received in a supporting block 68, which in turn is mounted to the front of the frame 47. The supporting block 68 is formed with a pair of elongated slots 69—69 designed to receive the guide fingers 67—67 and to allow horizontal adjustment thereof in order to accommodate strands of different diameters or to vary the line of approach of the strand 10 to the drum 41.

The bracket 16, including the deflector plate 18, is secured at its rearward extremity (FIG. 1) to a reciprocable carriage, designated generally by the numeral 76. The carriage 76 is mounted for sliding movement between the right and left, as viewed in FIGS. 1 and 2, along a pair of guide rods 77—77. Each of the guide rods 77—77 is mounted between a pair of supporting blocks 78—78, which are secured to the under side of the platform 52.

Figure 5:
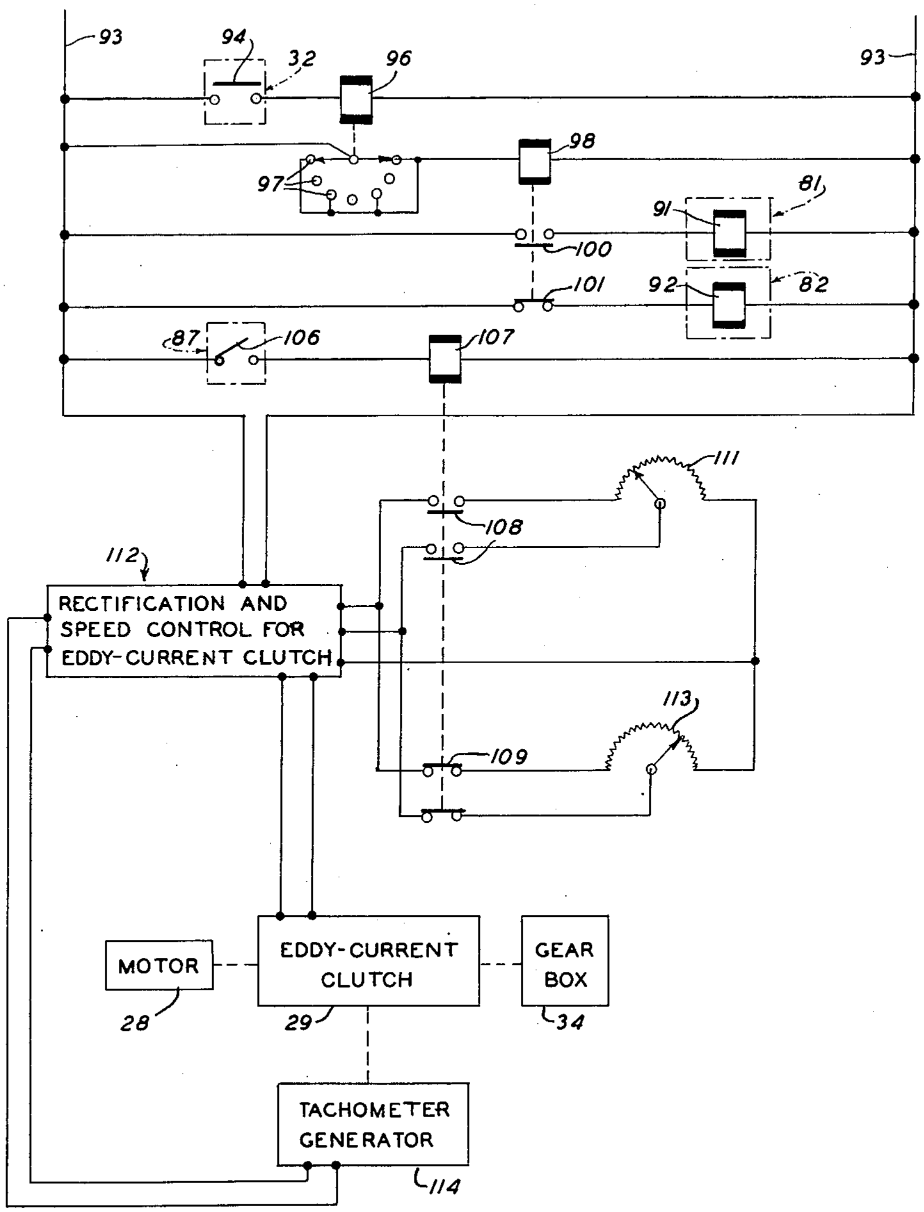
FIG. 5 is a schematic view of a control circuit for operating the apparatus illustrated in FIGS. 1 to 4, inclusive, according to the principles of the invention.

An air cylinder, designated generally by the numeral 79, is provided, having a piston rod 80 which is attached to the right side of the carriage 76, as viewed in FIGS. 1 and 2. A first solenoid valve is provided, designated generally in FIGS. 1 and 2 by the numeral 81. The valve 81 is designed, at certain intervals, for applying compressed air to the left end (FIGS. 1 and 2) of the air cylinder 79 to induce retraction of the piston rod 80 from left to right into the air cylinder 79 in order to index the deflector from the solid-line position 12 to the phantom-line position 12'. A second solenoid valve 82, which is similar to the valve 81 but is opposite in action, is also provided, designed at other intervals, to apply compressed air to the right end of the air cylinder 79 to drive the piston rod 80 a predetermined distance from the cylinder 79, in order to index the deflector from the outer position 12' back to the inner position 12. The control circuit for the valve 81 and 82 is illustrated in FIG. 5 and will be described in detail hereinafter.

The air cylinder 79 is mounted between a pair of supporting blocks 83—83, which are adjustably mounted to the under side of the platform 52. As seen in FIG. 1, the platform 52 is formed with a pair of elongated slots 84—84 designed to receive bolts 85—85, which may be tightened to secure the blocks 83—83 to the platform 52 but which may be loosened to permit right-to-left adjustment of the cylinder 79 and thus of the carriage 76 and the deflector 12. The position of the blocks 83—83 determines the outer position 12' of the deflector, and the inner position 12 is set by adjusting the stroke of the piston rod 80 in a conventional fashion.

As illustrated in FIGS. 1 and 3, a switch actuator 86 is secured to the left end (FIG. 3) of the carriage 76 and is designed to operate or allow operation of a switch, designated generally by the numeral 87, to either of two operating positions depending on the position of the carriage 76 and thus of the deflector 12. The switch 87 forms a part of the control circuit illustrated in FIG. 5 and is designed to control the state of energization of the eddy-current clutch 29, associated with the turntable-rotating motor 28, in order to regulate the rotational speed of the barrel 13 in accordance with the position of the deflector 12.

The switch 87 is mounted to the under side of a plate 88, which in turn is adjustably mounted to the underside of the platform 52, the pltaform being slotted to permit adjustable mounting in the same manner that the air-cylinder supporting blocks 83—83 are mounted. The switch 87 includes a spring-loaded operating arm 89, which is normally biased to the left, as illustrated in FIG. 1, to control the energization of the clutch 29 so as to rotate the turntable 27 at its higher speed, but which is contacted and depressed by the actuator 86, as the deflector nears the outer position 12', to decrease the energization of the clutch 29 so as to rotate the turntable 27 at its lower speed. The position of the mounting plate 88 is adjusted to locate the operating arm 89 of the switch 87, in accordance with the position of the air cylinder 79, and thus the outer position of the actuator 86.

Referring now to the control circuit illustrated in FIG. 5, a pair of oppositely-acting solenoids 91 and 92, associtaed with the solenoid valves 81 and 82, respectively, for the air cylinder 79, are disposed in parallel across a pair of A.C. supply conductors 93—93 for alternate energization in a timed sequence controlled by the magnetic switch 32. A contact 94 of the switch 32 is normally biased to an open position, as illustrated in FIG. 5, but is closed momentarily each time the magnetic actuator 31 (FIGS. 2 and 4) passes the switch 32. Each momentary closure of the contact 94 delivers an impulse to a stepping relay 96, which operates in a conventional manner through alternately jumpered and open contacts 97—97 to energize and de-energize a relay 98.

When the relay 98 is energized, a first contact 100 is closed and a second contact 101 is opened. Upon closure of the first contact 100, the solenoid 91 is energized to direct application of compressed air through the valve 81 to the left side of the air cylinder 79 in order to index the deflector from the inner position 12 to the outer position 12'. The solenoid 91 remains energized until the magnetic actuator 31 completes one full revolution so as to deliver a second impulse to the stepping relay 96, which steps the contacts 97—97 one position so as to de-energize the relay 98. Upon de-energization of the relay 98, the first contact 100 is reopened and the second contact 101 is reclosed, which operates to de-energize the first solenoid 91 and energize the second solenoid 92, respectively. When the solenoid 92 is energized, compressed air is directed through the valve 82 to the right side of the air cylinder 79 in order to index the deflector back to the inner position 12.

The angle through which the barrel 13 rotates at each of the distributing positions 12 and 12', and thus the circumferential length of each of the bands 22 and 23, is determined by the size of the pulley 39. It is possible to select this pulley for indexing the deflector once for each revolution of the barrel 13; however, it has been found more effective to vary the switching point slightly during the course of filling the barrel 13 so that each phase of the cycle lasts for somewhat more or somewhat less than 360° of rotation of the barrel 13.

The reason for switching at somewhat more or less than 360° is that a small depression or void occurs at the switching point and, with equal 360° phases, the effect of the depressions or voids is cumulative and results in uneven collection in the barrel 13; however, when the angle is not 360° the switching point is offset as the winding progresses and the depressions are spread out around the barrel 13, falling at a different point for each successive layer, which allows substantially even distribution of the strand 10 into the barrel 13. The optimum angle of rotation before each indexing has been found to be between about 340 and 350°, and is preferably set at approximately 345°, as illustrated in FIG. 4.

Each time the deflector 12 is indexed, the position of a contact 106 of the switch 87 (FIGS. 1 and 2) is changed to vary the degree of energization, by controlling the excitation current, of the eddy-current clutch 29 associated with the turntable-drive motor 28. According to the arrangement illustrated in FIG. 5, the contact 106 is closed whenever the deflector is in the outer position 12' to energize a selector relay 107, which then closes an upper pair of contacts 108—108 and opens a lower pair of contacts 109—109. Closure of the upper contacts 108—108 operates to connect a first potentiometer 111 in circuit with the eddy-current clutch 29 through a rectification and speed control unit, designated generally by the numeral 112. The setting of the potentiometer 111 may be adjusted to energize the eddy-current clutch 29 a predetermined amount in order to connect the input to the gear box 34 to the motor 28 so as to rotate the turntable 27 at a first predetermined speed corresponding to the speed desired when the deflector is in the outer position 12'.

Upon indexing of the deflector back to the inner position 12, the contact 106 of the switch 87 is reopened to de-energize the relay 107, which then opens the upper contacts 108—108 and closes the lowers contacts 109—109. Upon the closure of the lower contacts 109—109, a second potentiometer 113 is connected through the rectification and speed control unit 112 for energizing the eddy-current clutch 29. The setting of the second potentiometer 113 is also adjusted to control the amount of energization of the eddy-current clutch 29 in order to rotate a turntable 27 at a second predetermined speed corresponding to that desired when the deflector occupies the inner position 12.

In the example described, the rotational speed at the inner position is desired to be about three times that at the outer position; therefore, the second potentiometer 113 is set to provide approximately three times the excitation current for the clutch 29 than is provided by the first potentiometer 111. A tachometer generator 114 is also provided, responsive to the output speed of the clutch 29, to furnish a feedback signal to the rectification and speed control unit 112 proportional to the actual speed, which signal is compared by the unit 112 with a signal corresponding to the desired speed as controlled by the setting of the potentiometer 111 or 113 which is operative at the time.

*Operation of First Embodiment*

In order to start the take-up operation, the capstan motor 51 is started so that the strand 10 from the previous operation is advanced thereby and is discharged into space toward the deflector plate 18. The advancing strand 10 impinges against the deflector plate 18 forming a loop 21 in the process and slowing down so that the successive loops 21—21 descend relatively slowly into the barrel 13. The position of the idler sheave 46 is adjusted, and if need be the position of the deflector plate 18, with respect to the vertical is also adjusted, to the point where the loops 21—21 descend substantially vertically into the barrel 13.

The barrel 13 is rotated by the motor 28 through the eddy-current clutch 29, the gear box 34 and the pulleys

35 and 37, alternately, at its two relatively slow speeds so as to collect the descending strand loops 21—21. Assuming that the deflector plate 18 starts at its outer position 12', the barrel 13 is rotated at its lower speed to collect a first outer band 23 of the strand loops 21—21, as illustrated in FIG. 4.

When the barrel 13 has rotated through an angle of about 345°, the magnetic switch actuator 31 passes the switch 32 and closes momentarily the contact 94 of the switch 32. This operates the stepping relay 96 to its first state (an open contact 97) to de-energize the relay 98 so as to energize the solenoid 92 associated with the valve 82. Energization of the solenoid 92 supplies compressed air to the right side of the air cylinder 79 so as to index the deflector plate 18 from the outer position 12' to the inner position 12.

Substantially simultaneously with the indexing movement, the switch actuator 86 moves from right to left as viewed in FIG. 1, which movement allows the contact 106 of the switch 87 to open in order to connect the potentiometer 113 in circuit with the eddy-current clutch 29 so as to rotate the barrel 13 at the rotational speed required for the distribution of the inner band 22 of the strand loops 21—21. This speed is approximately three times the former speed of the barrel 13, so that the linear speed at the inner position ($V_A$) is substantially equal to the former linear speed ($V_B$).

The barrel 13 continues to rotate at the increased rotational speed and the strand is distributed in a first inner band 22, which contains overlapping loops 21—21 of substantially the same size and number per unit circumferential length as in the outer band 23. Since the circumferential path of the point in the barrel 13 below the inner line of distribution "A" is only approximately one third that of the point below the outer line "B," the total strand accumulated in the inner band 22 is approximately one third that accumulated in the outer band 23.

When the barrel 13 has rotated about 345° from the point of the first crossover, the magnetic switch actuator 31 again passes the switch 32 to close momentarily the contact 94. The second closure of the contact 94 operates the stepping relay 96 to its alternative state (one of the jumpered contacts 97—97) so as to de-energize the solenoid 92 and energize the solenoid 91. Upon energization of the solenoid 91, compressed air is supplied by the valve 81 to the left end of the air cylinder 79 so as to reciprocate the deflector plate 18 back to the outer position 12'. Upon this movement, the actuator 86 depresses the arm 89 of the switch 87 to close the contact 106 in order to connect the potentiometer 111 in circuit with the eddy-current clutch 29 so as to slow the barrel 13 back to its former speed in order to distribute a second outer band 23 of the loops 21—21 on top of the first such band.

In this manner, the barrel 13 is filled to a desired depth with an alternating succession of the outer and inner bands, 23 and 22, respectively, of the loops 21—21. Because of the increased rotational speed at the inner position, the outer and inner bands will build up at the same level to insure even distribution of the strand 10 in the barrel 13.

*Second Embodiment*

Figure 6:
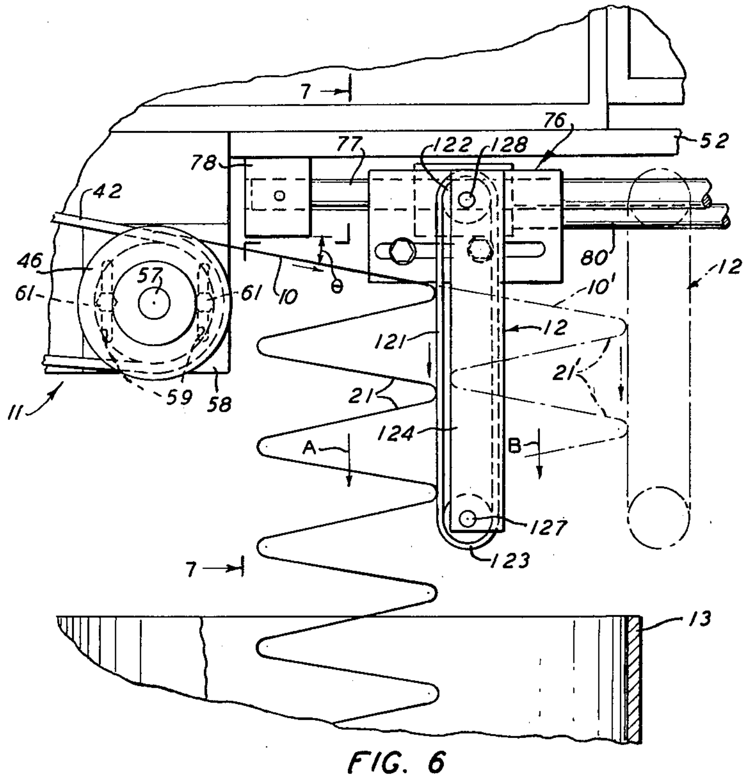
FIG. 6 is an enlarged front view of a deflector constituting a second embodiment of the invention, looking generally along a portion of the same line as in FIG. 2.
Figure 7:
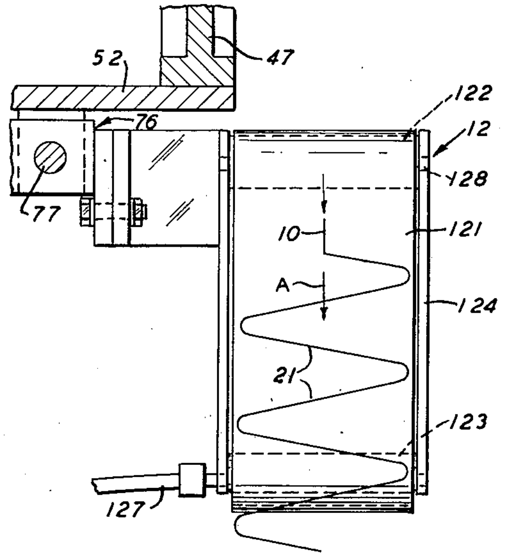
FIG. 7 is a side elevation of the deflector illustrated in FIG. 6, taken generally along the line 7—7 of FIG. 6 in the direction of the arrows.

A second embodiment of the invention is illustrated in FIGS. 6 and 7, the second embodiment being substantially the same as the first embodiment, just described, with the exception of the construction of the deflector, designated hereinabove generically by the numeral 12. Portions of the apparatus illustrated in FIGS. 6 and 7 which are the same as corresponding portions of the apparatus constituting the first embodiment of the invention have been given the same numerals formerly applied.

According to the second embodiment of the invention, the deflector 12 includes a moving, endless belt 121 mounted in the path of the advancing strand 10 and designed to deflect the strand downward in a series of loops 21—21 falling along a substantially vertical line (such as "A" or "B") into the rotating barrel 13, illustrated fragmentarily in FIG. 6 and operating substantially the same as described in the first embodiment of the invention.

The belt-type capstan 11, illustrated fully in FIGS. 1 and 2, is also suitable for advancing the strand 10 in this embodiment of the invention, a portion only of the capstan 11 being illustrated in FIG. 6. As in the first embodiment, the discharge sheave 46 is adjusted to deliver the strand 10 at an angle $\theta$, preferably between about 10° and 20° below the horizontal, toward the moving belt 121. The endless belt 121 is mounted above the receiver and substantially vertically, so that the advancing strand 10 impinges against one side of the belt 121, the left side as viewed in FIG. 6. Means are provided for moving the endless belt 121 so that the side thereof against which the strand 10 impinges moves downward, which causes the strand 10 to be deflected downward in a series of loops falling along a substantially vertical line, such as "A" or "B," into the rotating barrel 13.

The belt 121 may be passed about a pair of pulleys 122 and 123, which are journaled within a supporting bracket 124, as best seen in FIG. 7. The supporting bracket 124 is carried at one end of the carriage 76 for movement therewith. The carriage 76 may be substantially the same as that illustrated in FIGS. 1, 2 and 3, being mounted for indexing movement in the same manner as viewed in those figures and under the control of the circuit illustrated in FIG. 5.

The left-hand surface of the moving belt 121 is designed for indexing between an inner position 12 seen in solid lines in FIG. 6 and an outer position 12′ shown in phantom lines in that figure, which positions correspond to the positions of the deflector plate 18 shown in the first embodiment of the invention. With this arrangement, the strand 10 is distributed sequentially along the lines "A" and "B" for substantially the same purposes described hereinbefore, except that the moving belt 121 operates to carry the impinging strand 10 away from the point of impingement and loop formation so as to prevent tangling of the strand at higher speeds.

The lower pulley 123 is rotated through a flexible shaft 127, which is driven in a conventional manner by the capstan motor 51, through suitable gear-reduction means, to insure synchronism between the speed of the strand 10 and the speed of the belt 121. The upper pulley 123 is keyed to a stub shaft 128, which is mounted for idling rotation within bearings in the support 124.

*Third Embodiment*

Figure 8:
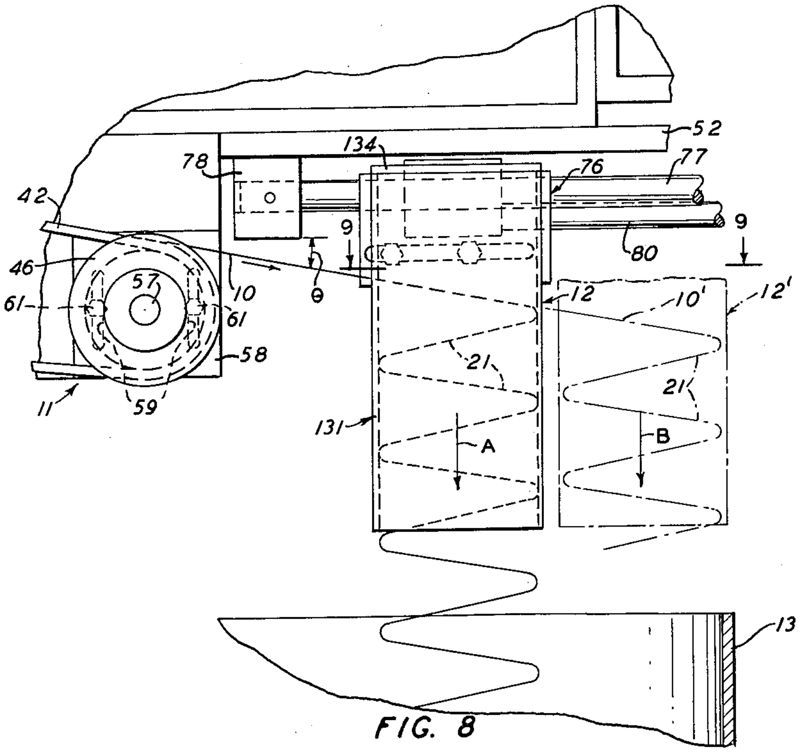
FIG. 8 is an enlarged front view of a deflector constituting a third embodiment of the invention, looking generally along a portion of the same line as in FIG. 2.
Figure 9:
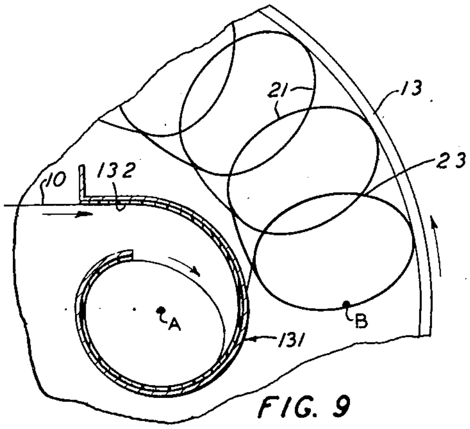
FIG. 9 is a horizontal section through the deflector illustrated in FIG. 8, taken along the line 9—9 of FIG. 8 in the direction of the arrows.

A third embodiment of the invention is illustrated in FIGS. 8 and 9, the third embodiment also making use of substantially the same apparatus as in the first and second embodiments, with the exception of the construction of the deflector designated earlier generically by the numeral 12. The portions of the apparatus illustrated in FIGS. 8 and 9 which are the same as corresponding portions of the apparatus illustrated in the first and second embodiments of the invention have been given the same numerals formerly applied.

According to the third embodiment of the invention, a spiral deflector is provided, designated generally by the numeral 131. The spiral deflector 131 is designed to receive the advancing strand 10 and to direct the strand downward in a series of loops 21—21 falling along a substantially vertical line into the rotating receiver 13, a portion of which is illustrated in FIG. 8.

The deflector 131 mounted above the receiver, is disposed substantially vertically as seen in FIG. 8, and has a spiral cross section as seen in FIG. 9. The deflector 131 is so disposed with respect to the advancing strand 10 that the strand enters the deflector in a line substantially tangent to a large-radius end 132 of the spiral. The strand 10 is constrained by the deflector 131 to travel in a descending path for two or three revolutions around the spiral, thus positively forming the loops 21—21, which leave the deflector 131 at the lower end thereof (FIG. 8) and fall downward into the rotating barrel 13. The working surface of the spiral deflector 131 is preferably lined with a relatively friction-free material such as Teflon.

The lower right-hand portion of the belt-driven capstan 11 is shown fragmentarily in FIG. 8 and is operative in the manner discussed previously to direct the strand 10 at an angle $\theta$ of between 10° and 20° toward the spiral deflector 131. The deflector 131 is secured at its top (FIG. 8) to a mounting plate 134, which in turn is secured for reciprocation with the carriage 76 in substantially the same manner described hereinbefore with respect to the first and second embodiments of the invention.

As in the other embodiment of the invention, the spiral deflector 131 is moved between an inner position 12 (shown in solid lines in FIG. 8) and an outer position 12′ (shown fragmentarily in phantom lines in that figure). With this construction, the strand 10 is discharged from the deflector 131 in alternative, descending-spiral paths having center lines designated by the letters "A" and "B," which occupy substantially the same positions with respect to the rotating barrel 13 as the corresponding lines of descent "A" and "B" described in the first and second embodiments of the invention.

The spiral deflector 131 is effective to slow down the advancing strand 10 so as to enable distribution of strands advancing at relatively high rates of speed and, further, to constrain the formation of the loops 21—21 illustrated in FIG. 4.

It will be manifest that this invention is not limited to the specific details described in connection with the above embodiments of the invention, but that various modifications may be made without departing from the spirit and scope thereof.

What is claimed is:

1. Apparatus for distributing a strand into a rotatable open-topped receiver, which comprises means for rotating the receiver, means for advancing the strand into space in a line between about 10° and 20° below the horizontal, and a deflector mounted above the receiver, generally vertically, and in the path of the advancing strand, said deflector being so constructed and arranged and the angle of advancement of the strand being so regulated that the strand impinges upon said deflector forming a loop thereupon and is then deflected downward in a series of preformed loops falling along a substantially vertical line into the rotating receiver, the number of loops per unit length of the strand being substantially independent of the rotary movement of the receiver.

2. Apparatus for distributing a strand into a rotatable open-topped receiver, which comprises means for rotating the receiver; a belt-type capstan for advancing the strand into space, the belt-type capstan including a driven drum, a plurality of sheaves, and a belt passing between portions of the peripheries of the drum and the sheaves, the strand passing between the belt and the drum and being gripped and advanced thereby into space, the surface of the drum being knurled so that the strand is advanced into space along a straight line defined by the upper surface of a straight portion of the belt extending between the drum and a discharge one of the sheaves; means for adjusting the position of the discharge one of the sheaves to adjust the angle of advancement of the strand with respect to the horizontal to a predetermined value; and a deflector mounted in the path of the advancing strand and designed to direct the strand downward in a series of loops falling along a substantially vertical line into the rotating receiver.

3. Apparatus for distributing a strand into a rotatable open-topped receiver, which comprises means for rotating the receiver, means for advancing the strand into space in a path having a horizontal component, a deflector mounted in the path of the advancing strand and designed to preform the strand into a series of loops and to direct the series of preformed loops downwardly so that said loops fall along a substantially vertical line into the rotating receiver, the number of loops per unit length of the strand being substantially independent of the rotary movement of the receiver, means for indexing said deflector radially with respect to the rotational axis of the receiver to change the line of distribution of the strand into the receiver, and means for controlling the operation of said indexing means so that the position of said deflector is fixed for a predetermined angle of rotation of the receiver and is then indexed to another position for another predetermined angle of rotation of the receiver.

4. Apparatus for distributing a strand into a rotatable open-topped receiver, which comprises means for rotating the receiver, means for advancing the strand into space in a path having a horizontal component, a deflector mounted in the path of the advancing strand and designed to preform the strands into a series of loops and to direct the series of preformed loops downwardly so that said loops fall along a substantially vertical line into the rotating receiver, the number of loops per unit length of the strand being substantially independent of the rotary movement of the receiver, means for indexing said deflector transversely with respect to the rotational axis of the receiver to change the line of distribution of the strand into the receiver, and means operated by said receiver-rotating means for controlling the operation of said indexing means so that the position of said deflector is fixed for a predetermined angle of rotation of the receiver and is then indexed to another position for another predetermined angle of rotation of the receiver.

5. Apparatus for distributing a strand into a rotatable open-topped receiver, which comprises variable-speed means for rotating the receiver, means for advancing the strand, a deflector mounted in the path of the advancing strand and designed to direct the strand downward in a series of loops falling along a substantially vertical line into the rotating receiver, means for indexing said deflector transversely with respect to the rotational axis of the receiver to change the line of distribution of the strand into the receiver, means for controlling the operation of said indexing means so that the position of said deflector is fixed for a predetermined angle of rotation of the receiver and is then indexed to another position for another predetermined angle of rotation of the receiver, and means operable upon each change of position of said deflector for controlling the speed of said receiver-rotating means so that the linear speed of the point in the receiver directly below the line of distribution of the strand is substantially the same at each transverse position of said deflector.

6. Apparatus for distributing a strand into a rotatable open-topped receiver, which comprises variable-speed means for rotating the receiver, means for advancing the strand, a deflector mounted in the path of the advancing strand and designed to direct the strand downward in a series of loops falling along a substantially vertical line into the rotating receiver, means for indexing said deflector transversely with respect to the rotational axis of the receiver to change the line of distribution of the strand into the receiver, means for controlling the operation of said indexing means so that the position of said deflector is fixed for a predetermined angle of rotation of the receiver and is then indexed to another position for another predetermined angle of rotation of the receiver, and means operated by said deflector upon indexing thereof for controlling the speed of said receiver-rotating means so that the linear speed of the point in the receiver directly below the line of distribution of the strand is substantially the same at each transverse position of said deflector.

7. Apparatus for distributing a strand into a rotatable open-topped receiver, which comprises variable-speed means for rotating the receiver, means for advancing the strand, a deflector mounted in the path of the advancing strand and designed to direct the strand downward in a series of loops falling along a substantially vertical line into the rotating receiver, means for indexing said deflector transversely with respect to the rotational axis of the receiver to change the line of distribution of the strand into the receiver, means operated by said receiver-rotating means for controlling the operation of said indexing means so that the position of said deflector is fixed for a predetermined angle of rotation of the receiver and is then indexed to another position for another predetermined angle of rotation of the receiver, and means operated by said deflector upon indexing thereof for controlling the speed of said receiver-rotating means so that the linear speed of the point in the receiver directly below the line of distribution of the strand is substantially the same at each transverse position of said deflector.

8. Apparatus for distributing a strand into a rotatable open-topped receiver, which comprises variable-speed means for rotating the receiver, means for advancing the strand, a movable carriage, a deflector mounted to said carriage, in the path of the advancing strand, and designed to direct the strand downward in a series of loops falling along a substantially vertical line into the rotating receiver, means for indexing said carriage so that said deflector moves transversely with respect to the rotational axis of the receiver to change the line of distribution of the strand into the receiver, means operated by said receiver-rotating means for controlling the operation of said carriage-indexing means so that the position of said deflector is changed approximately once for each revolution of the receiver, and means operated by said carriage upon each indexing thereof for controlling the speed of said receiver-rotating means so that the linear speed of the point in the receiver directly below the line of distribution of the strand is substantially the same at each transverse position of said deflector.

9. Apparatus for collecting a flexible strand, which comprises a barrel, variable-speed means for rotating the barrel, means for advancing the strand, a deflector mounted in the path of the advancing strand and designed to direct the strand downward in a series of loops falling along a substantially vertical line into the rotating barrel, means for indexing said deflector transversely with respect to the rotational axis of the barrel between an inner position wherein the center line of the descending strand loops is located approximately ¼ of the radius of the barrel out from the axis of rotation thereof and an outer position wherein the center line of the descending strand loops is located approximately ¾ of the radius of the barrel out from the axis of rotation thereof, means for controlling the operation of said indexing means so that the position of said deflector is changed each time the barrel rotates through an angle between approximately 340° and 350°, and means operable upon each indexing of said deflector for controlling the speed of the barrel-rotating means so that the rotational speed of the barrel when said deflector occupies the inner position is approximately three times greater than the rotational speed when said deflector occupies the outer position.

10. Apparatus for distributing a flexible strand into a rotatable open-topped receiver, which comprises means for rotating the receiver, means for advancing the strand into space in a line between about 10° and 20° below the horizontal, and endless belt mounted substantially vertically above the receiver so that the advancing strand impinges against one side thereof, and means for moving said endless belt so that the side thereof against which the strand impinges moves downward, whereby the strand is deflected downward in a series of loops falling along a substantially vertical line into the rotating receiver.

11. Apparatus for distributing a flexible strand into a rotatable open-topped receiver, which comprises means for rotating the receiver, means for advancing the strand into space in a line between about 10° and 20° below the horizontal, and a deflector mounted above the receiver, disposed substantially vertically, and having a spiral cross section, said deflector being so disposed with respect to the advancing strand that the strand enters the deflector in a line substantially tangent to a large-radius portion of the spiral and then travels in a descending spiral path around the deflector, thus forming the strand into a series of loops leaving the lower end of said deflector and falling downward along a substantially vertical line into the rotating receiver.

12. Apparatus according to claim 1, wherein the deflector is a flat plate.

13. Apparatus for distributing a flexible strand into a rotatable open-topped receiver, which comprises means for rotating the receiver, means for advancing the strand into space along a path having a horizontal component, and a deflector mounted above the receiver, disposed substantially vertically, and having a substantially spiral horizontal cross section, said deflector being so disposed with respect to the advancing strand that the strand enters the deflector along a line substantially tangent to a large-radius portion of the spiral and then travels in a descending spiral path around the deflector to form the strand into a series of preformed loops leaving the lower end of said deflector and falling downward along a substantially vertical line into the rotating receiver, the number of loops per unit length of the strand being substantially independent of the rotary movement of the receiver.

14. Apparatus for forming loops in an indefinite length of strand material, which comprises means for advancing successive portions of a strand at a relatively high rate of speed along a path having a horizontal component, a strand receiver, and a strand deflector having a substantially vertical strand-impinging surface oriented at a higher elevation than the strand receiver and in the path of advancement of the strand so that the advancing strand impinges against said strand-impinging surface of the deflector, the relationship between the angular orientation of the strand-impinging surface of the deflector and the velocity of the advancing strand being such that the strand impinging against the deflector is formed into a series of loops which fall onto the strand receiver, the number of loops formed per unit length of the strand being substantially independent of any relative movement between the strand receiver and the deflector.

15. Apparatus for forming loops in an indefinite length of strand material, which comprises means for advancing successive portions of a strand at a relatively high rate of speed along a path having a horizontal component, a strand receiver, a strand deflector having a strand-impinging surface oriented at a higher elevation than the strand receiver and in the path of advancement of the strand so that the strand impinges against the strand-impinging surface of the deflector, the relationship between the angular orientation of the strand-impinging surface of the deflector and the velocity of the advancing strand being such that the strand impinging against the deflector is formed into a series of loops which fall onto the strand receiver, the number of loops formed per unit length of the strand being substantially independent of any relative movement between the strand receiver and the deflector, and indexing means for intermittently causing relative displacement between the deflector and the strand receiver to a plurality of relative relationships in order to deposit the formed loops onto a plurality of areas of the strand receiver.

16. Apparatus for forming loops in an indefinite length of strand material, which comprises means for advancing successive portions of a strand at a relatively high rate of speed along a path having a horizontal component, a strand receiver, a strand deflector having a substantially vertical strand-impinging surface oriented at a higher elevation than the strand receiver and in the path of advancement of the strand so that the strand impinges against the strand-impinging surface of the deflector, the relationshp between the angular orientation of the strand-impinging surface of the deflector and the velocity of the advancing strand being such that the strand impinging against the deflector is formed into a series of loops which fall onto the strand receiver, the number of loops formed per unit length of the strand being substantially independent of any relative movement between the strand receiver and the deflector, and means for causing relative movement between the strand receiver and the deflector to distribute the formed loops onto the strand receiver.

17. Apparatus for forming loops in an indefinite length of strand material, which comprises means for advancing successive portions of a strand at a relatively high rate of speed along a path having a horizontal component, a strand receiver, a strand deflector having a strand-impinging surface oriented at a higher elevation than the strand receiver and in the path of advancement of the strand so that the strand impinges against said strand-impinging surface of the deflector, the relationship between the angular orientation of the strand-impinging surface of the deflector and the velocity of the advancing strand being such that the strand impinging against the deflector is formed into a series of loops which fall onto the strand receiver, the number of loops formed per unit length of the strand being substantially independent of any relative movement between the strand receiver and the deflector, means for causing relative movement between the strand receiver and the deflector to distribute the formed loops onto the strand receiver, and indexing means for intermittently causing relative displacement between the deflector and the strand receiver to a plurality of relative relationships in order to vary areas of distribution of the formed loops onto the strand receiver.

18. The apparatus defined in claim 14, wherein the strand-advancing means includes a belt-type capstan designed for advancing the strand along a straight line and means associated with the belt-type capstan for adjusting the angle of advancement of the strand with respect to the horizontal to a predetermined value.

19. The apparatus defined in claim 15 having means for controlling the indexing means for maintaining the deflector and the strand receiver in each one of the plurality of relative relationships desired preselected intervals of time, the intervals of time being directly proportional to the numbers of loops being deposited onto the respective areas of the strand receiver.

20. Apparatus for forming loops in an indefinite length of strand material, which comprises means for advancing successive portions of a strand at a relatively high rate of speed along a path having a horizontal component, a strand receiver, a strand deflector having a strand-impinging surface oriented at a higher elevation than the strand receiver and in the path of advancement of the strand so that the strand impinges against said strand-impinging surface of the deflector, the relationship between the angular orientation of the strand-impinging surface of the deflector and the velocity of the advancing strand being such that the strand impinging against the deflector is formed into a series of loops which fall onto the strand receiver, the number of loops formed per unit length of the strand being substantially independent of any relative movement between the strand receiver and the deflector, means for causing relative movement between the strand receiver and the deflector to distribute the formed loops onto the strand receiver, indexing means for intermittently causing relative displacement between the deflector and the strand receiver to a plurality of relative relationships in order to vary areas of distribution of the formed loops onto the strand receiver, and means for controlling the indexing means for maintaining the deflector and the strand receiver in each one of the plurality of relative relationships desired preselected intervals of time, the intervals of time being directly proportional to the numbers of loops being deposited onto the respective areas of the strand receiver.

21. Apparatus for distributing a strand into a rotatable open-topped receiver, which comprises means for rotating the receiver, means for advancing a strand at a relatively high speed along a path having a horizontal component, and a moving endless belt, a substantially vertically oriented, downwardly moving leg of the belt being mounted above the receiver and in the path of the advancing strand so that, as the strand impinges against said leg, the strand is formed into a series of loops which fall downwardly into the rotating receiver, the number of loops per unit length of the strand being substantially independent of the rotary movement of the receiver.

References Cited in the file of this patent

UNITED STATES PATENTS

| | | |
|---|---|---|
| 1,557,830 | Gurley | Oct. 20, 1925 |
| 1,653,311 | Rice et al. | Dec. 20, 1927 |
| 1,882,760 | Brown | Oct. 18, 1932 |
| 2,132,573 | McDonald | Oct. 11, 1938 |
| 2,155,879 | Washburn et al. | Apr. 25, 1939 |
| 2,404,742 | Polak et al. | July 23, 1946 |
| 2,638,146 | Rounseville et al. | May 12, 1953 |
| 2,722,729 | Wilhelm | Nov. 8, 1955 |
| 2,743,065 | Watkins | Apr. 24, 1956 |
| 2,849,195 | Richardson et al. | Aug. 26, 1958 |
| 2,857,116 | Krafft et al. | Oct. 21, 1958 |
| 2,868,474 | Lewis | Jan. 13, 1959 |